Sept. 1, 1925.

F. T. HAGUE 1,552,383

VENTILATION OF DYNAMO ELECTRIC MACHINES

Filed July 14, 1923   3 Sheets-Sheet 1

WITNESSES:
R. J. Butler
S. M. Pineles

INVENTOR
Floyd T. Hague.
BY
Wesley G. Carr
ATTORNEY

Patented Sept. 1, 1925.

1,552,383

UNITED STATES PATENT OFFICE.

FLOYD T. HAGUE, OF PITTSBURGH, PENNSYLVANIA, ASSIGNOR TO WESTINGHOUSE ELECTRIC & MANUFACTURING COMPANY, A CORPORATION OF PENNSYLVANIA.

VENTILATION OF DYNAMO-ELECTRIC MACHINES.

Application filed July 14, 1923. Serial No. 651,557.

*To all whom it may concern:*

Be it known that I, FLOYD T. HAGUE, a citizen of the United States, and a resident of Pittsburgh, in the county of Allegheny and State of Pennsylvania, have invented a new and useful Improvement in Ventilation of Dynamo-Electric Machines, of which the following is a specification.

My invention relates to dynamo-electric machines and it has special reference to the ventilation of rotary converters and machines of a similar type.

The object of my invention is, in its broad aspects, to provide a system for the ventilation of rotary converters whereby the flow of cooling air is so directed as to effect efficient and thorough cooling and noiseless operation of the machine without impairing the accessibility of the slip rings and other vital parts of the machine.

A more specific object of my invention is to provide a casing for enclosing a portion of the rotary converter and to exhaust the cooling air from the surrounding space into the enclosure formed by said casing and discharge, therefrom through an exhaust port provided with a duct for carrying the heated air out of the operating room.

The operating voltage of a rotary converter is usually determined by the maximum voltage permissible on the commutator side and it is limited, therefore, to a comparatively low value. Accordingly, for machines having large outputs, relatively large currents must be conveyed through the current collecting devices of such machines, necessitating the use of a large commutator on the direct-current side and large slip rings on the alternating-current side. The surfaces of the slip rings are covered with a multitude of brushes. The current collecting devices, and particularly the slip rings and the slip ring brushes, are highly sensitive in operation and require almost constant attention and inspection, owing chiefly to the tendency for the current to concentrate in one or more of the parallel-connected brushes.

The above-mentioned requirements are serious obstacles in the way of providing a closed or semi-closed ventilating system for rotary converters and, so far as I am aware, such systems have not been successfully developed or put in operation, although large economies and higher rating of the machines make such arrangements very desirable.

In recent years, rotary converters have been extensively adopted in Edison systems for the supply of low-voltage direct current in their distributing lines, necessitating the operation of rotary converters in substations situated in some of the most restricted building districts of the larger cities and forcing the converter apparatus on account of its noisy operation and the excessive cost of ground floor space, to be located in sub-basements having extremely poor ventilaing conditions. It has been proved practically impossible to adequately ventilate the large machines when located in such basements and the machines, when made according to the present practice, must be operated either at a reduced rating or at a higher temperature than designed for, thus reducing the life of the machine.

The effect of the high ambient room temperatures on the operating personnel is also very undesirable and it has necessitated, in some cases, working the men in four-hour shifts instead of the usual eight-hour periods.

In order to avoid the above difficulties, the converters have often been placed on the ground floors having more favorable ventilating conditions. Such an arrangement is, however, only rarely practicable because the location on the ground floor usually requires noiseless operation which is not obtainable with the present open construction of the machines.

By a novel use of an exhaust system of ventilation, my invention obviates the above described objectionable features of rotary converters while retaining the accessibility of the highly sensitive current collecting devices thereof.

With the foregoing and other objects in view, my invention consists in the arrangements and details of construction described and claimed herein and illustrated in the accompanying drawings, wherein—

Figure 1:
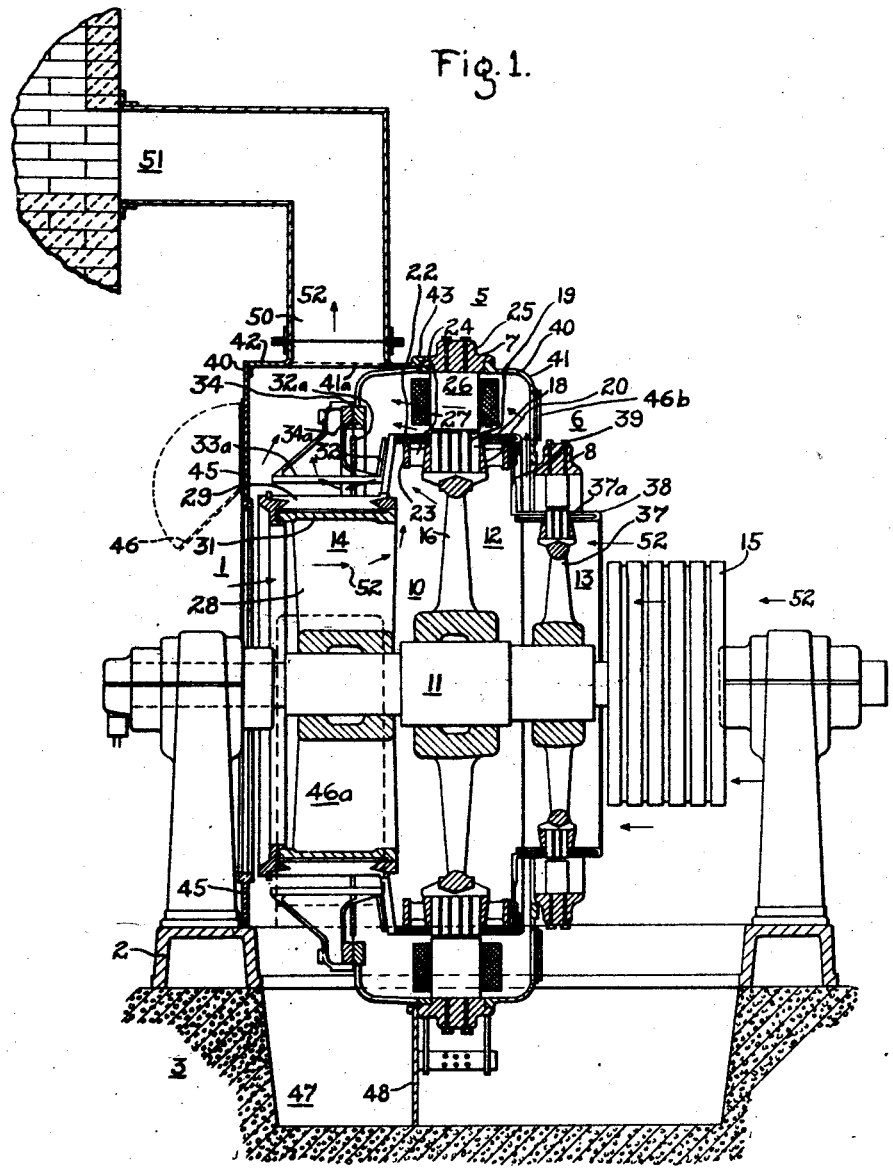
Figure 1 is a sectional view of a rotary converter of the booster type embodying my invention.
Figure 2:
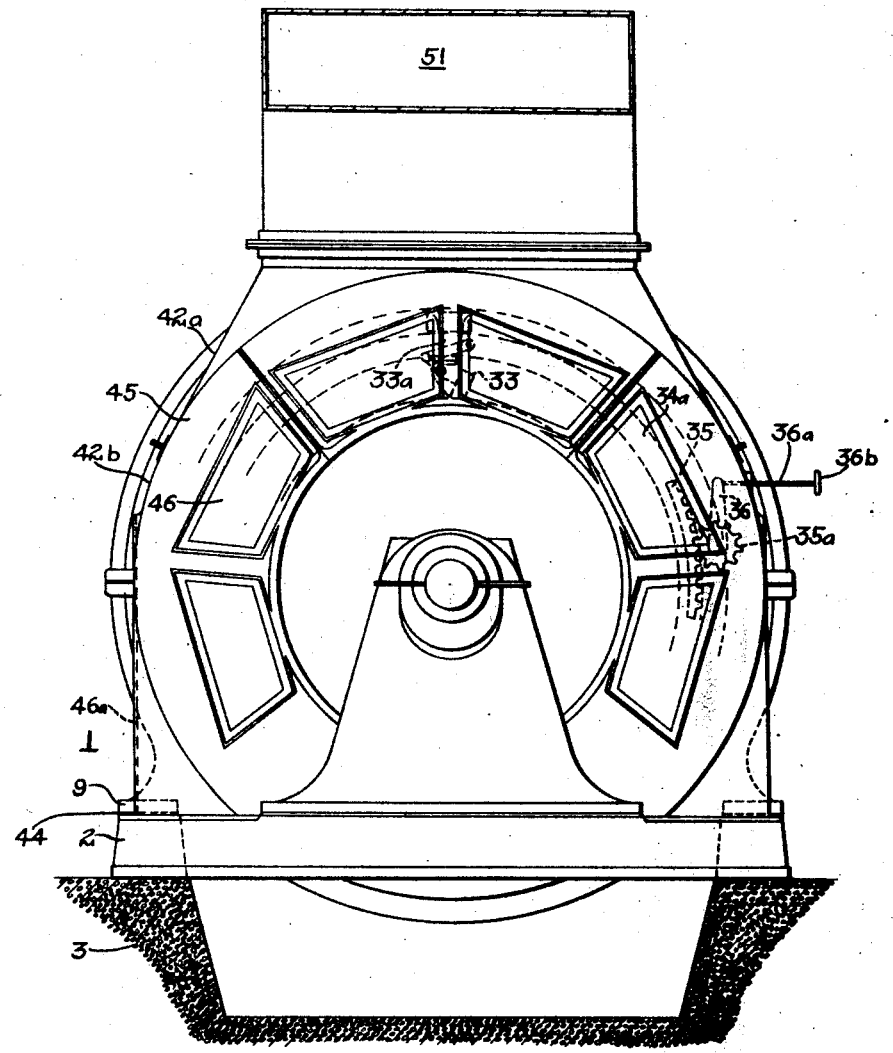
Fig. 2 is an end elevational view of the converter shown in Fig. 1.

Referring to Figs. 1 and 2, a synchronous converter unit 1 is mounted upon a bed plate 2 which is secured to a foundation 3 in the floor of an operating room. The converter unit comprises a rotary converter machine 5 and a booster machine 6, said machines having stators 7 and 8, respectively, secured to the bed plate by means of supporting feet 9. A rotating member 10, which co-operates with the stators, comprises a shaft 11 upon which are mounted a converter armature 12, a booster armature 13, a commutator member 14 and a plurality of slip-rings 15.

The converter armature 12 comprises a spider 16 carrying an annular laminated magnetic core 18. The laminations of the magnetic core 18 are assembled in groups to provide radial ventilating ducts or spaces 19 therebetween, and they are held together by means of two annular end plates 20 secured to the periphery of the spider 16. The armature core is wound with coils 22 having over-hanging end portions secured to supporting rings 23 which are attached to the aforementioned end plates 20 by means of integrally cast webs or spokes 24. The stator member 7 of the converter 5 comprises a field frame or yoke member 25 carrying a plurality of laminated pole pieces 26 that are excited by means of coils 27 mounted thereon.

In front of the converter armature 11 is mounted the commutator cylinder 14 comprising a spider 28 and commutator bars 29 which are mounted on the circumference 31 of the spider. The individual commutator bars are connected to the armature winding by means of strips of copper 32 forming the "neck" of the commutator. The commutator cylinder co-operates with brushes 33 held by brush holders secured to brush holder brackets 33ª mounted upon a rocker ring 34 which is secured to the stator frame 25.

An annular baffle plate 32a is secured to the brushholder brackets 33a in front of the commutator "neck" 32 for purposes referred to hereinafter.

The rocker-ring serves further as a support for a brush-raising device comprising a rotatably mounted brush-raising ring 34a which is operated by means of a rack portion 35 and a pinion 35a. The pinion 35a is actuated by a lever arm 36 mounted upon the rocker-ring. The lever arm 36 may be operated by means of a laterally projecting rod 36a and a hand wheel 36b which is accessibly mounted on one side of the machine. The particular details of the brush raising device are described in Patent No. 1,251,835, granted on January 1, 1918 to W. Strutt and assigned to the Westinghouse Electric and Manufacturing Company, and in my co-pending application Serial No. 610,778, filed Jan. 6, 1923 and assigned to the Westinghouse Electric and Manufacturing Company, and said details do not constitute a part of my present invention.

The booster machine 6 is mounted adjacent to the rear end of the converter machine, and consists of a stator 8 which is similar to that of the converter member but of proportionally smaller dimensions, and an armature 13 co-operating therewith. The booster armature 13 comprises a spider 37, a circular laminated core 37a secured to the spider and a winding 38 embedded in slots in the laminated core 37a. One side of the booster winding 38 is connected to the converter armature winding 22 by means of connecting strips 39 and the other side of the booster winding is connected to a plurality of slip-rings or collector rings 15 mounted on the shaft in rear of the booster armature. The collector rings co-operate with a plurality of brushes, not shown in the drawing, as is well understood in the art.

In carrying out my invention, I provide the stator 7 of the converter 5 with a casing 40 which comprises a bell-shaped rear portion 41 extending to, or adjacent to the circumference of the stator frame of the booster. The casing 40 also comprises a front portion 41a extending to a region near the front edge of the commutator cylinder. The front portion 41a of the casing comprises a circumferential member of horse-shoe shape 42 extending over the top and sides of the commutator and secured to the front edge 43 of the converter stator frame 25. The circumferential member 42 may be further secured to the front portion 44 of the bed plate 2.

The front portion 41a of the casing also comprises a front wall 45 which extends to within a few inches of the front end of the commutator spider member 28. Because of the proximity of the commutator and the danger of commutator flashing, the front wall 45 is preferably made of insulating material such as asbestos board. The circumferential portion 42 may consist of several separately demountable segments of cast iron or sheet iron and is shown comprising a circular upper portion 42a and two side walls 42b. The front wall is provided with glass windows 46 to facilitate inspection of the commutator operation and minor repairs and adjustments. The rear portion 41 of the casing is also provided with windows for the inspection of the windings.

The two side walls 42b are provided with doors 46a of sufficient size to permit entrance into the enclosure for repairing and adjusting the machine without the necessity of removing the casing. The rod 36a for operation of the brush-lifting device projects through one of the side walls 42b, the hand wheel 36b, for operating the brushes-lifting device being operated from outside of the enclosure.

The lower portion of the enclosure is formed of a pit hole 47 in the foundation 3 of the converter and a partition 48 that is secured to the front edge of the converter frame.

The upper portion of the circumferential member 42 is provided with an exhaust opening 50 which is connected to a conduit or flue 51 that leads to a space outside the room in which the converter is located. The casing 40 and the flue 51 are preferably lined with a sound-deadening material, with felt for instance, for better muffling the noises within the same.

The arrangements of the webs or spokes upon the armature spider and the coil supporting rings, as well as the shapes of the armature coils 22 and 38 and of the connecting strips 32 and 39 connecting the commutator and the booster to the converter armature winding 22, are such that upon the rotation of the rotary member the air is sucked in by the converter armature along the paths indicated by arrows 52, the heated air being discharged into the enclosure formed by the front portion 41a of the casing. The heated air escapes through the flue 51 to the space outside the operating room. The baffle plate 32a disposed adjacent to the commutator neck serves to reduce the otherwise excessive speed of the air which is discharged by the strips 32 of the commutator neck, and also to divert a portion of the air towards the commutator cylinder 29 for the better cooling of the same.

By means of my invention, the air in the operating room may be kept at a low temperature. Furthermore, I employ only such enclosing covers as are required to direct the cooling air through the most efficient cooling paths in the apparatus. The natural paths of the air-flow along the collector rings and through the booster spider, on one side, and through the commutator spider, on the other side, secure efficient cooling of the machine while permitting inspection and accessibility of the current-collecting devices.

Figure 3:
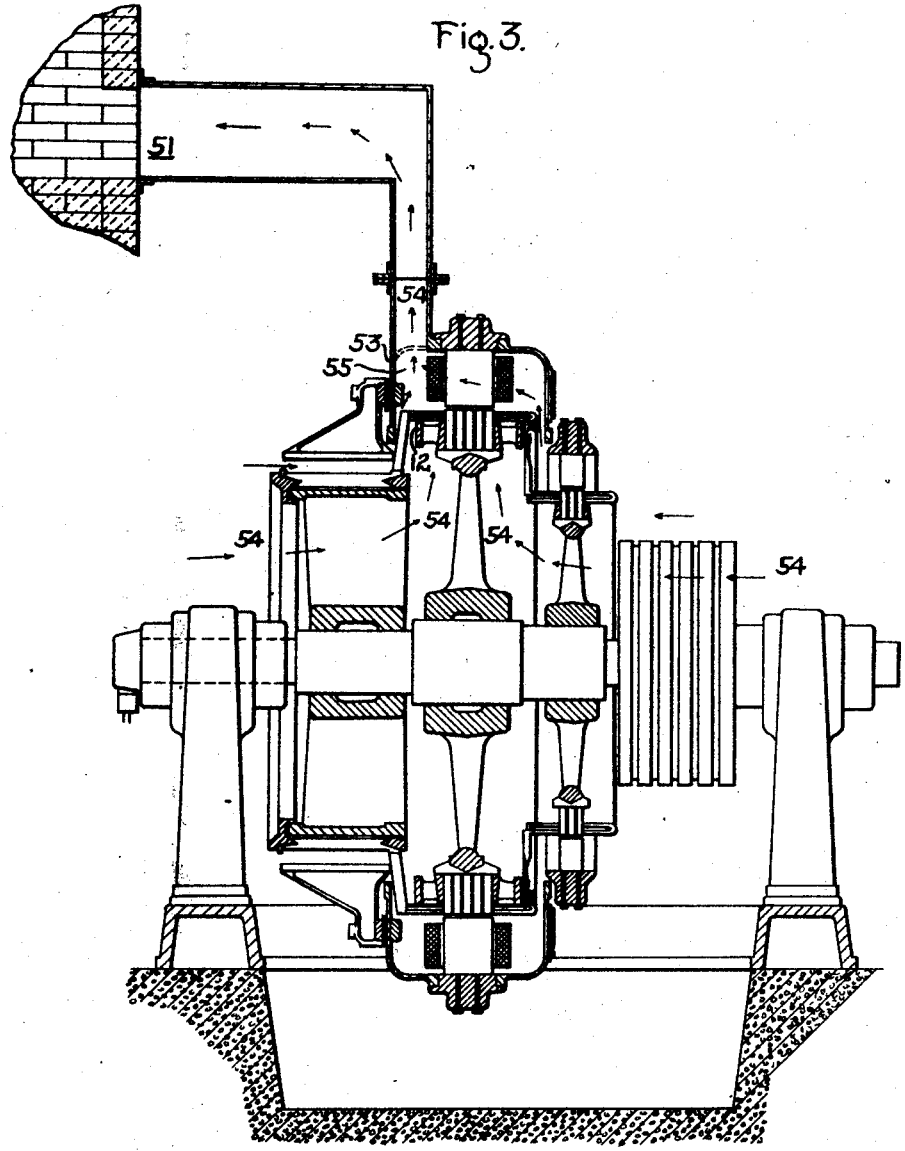
Fig. 3 is a sectional view of a rotary converter embodying my invention in a modified form.

In Fig. 3 is shown a modification of my invention which permits full accessibility of the commutator cylinder as well as of the collector rings while securing all the advantages of the semi-closed ventilation system of Fig. 1. The construction of the machine is similar to that of Fig. 1 except that the front portion of the enclosure is made of a bell-shaped casing 53 that extends downwardly to within a few inches of the front end of the armature winding 12, leaving the space around the commutator free and accessible.

In operation, the air is sucked in by the converter armature from both sides, as indicated by the arrows 54, and is discharged into the enclosure 55 within the bell-shaped casing 53 around the front end of the converter armature. The cooling air passes, on one side, over the collector rings and through the booster rotor and stator, and on the other side, along the commutator, to the converter armature and thence to the enclosure 55. The heated air is discharged through the flue 51 as in Fig. 1.

With the above described arrangements, I not only secure a uniform flow of cooling air through the most efficient cooling paths, but I eliminate entirely the serious defect of mixing the incoming cool air with the hot exhaust air, which would necessitate the handling of much more air than is required to cool the converter. While obtaining the foregoing advantages, I have, at the same time, secured a maximum of accessibility of the sensitive machine parts. The exhaust type of ventilation which is utilized in my invention permits furthermore the employment of structure to partially eliminate and to partially enclose and muffle the noises which are caused by the flow of the ventilating air through the rotating armature and the stationary part of the machine.

In the illustrated embodiments of my invention, I employ the rotation of the armature for creating the suction and for propelling the cooling air, although any other internal means may be employed for creating the pressure difference necessary to circulate the cooling air through the machine. Many other modifications of my invention will be evident to those skilled in the art and I desire that the appended claims shall cover all modifications which come within the scope and spirit of my invention.

I claim as my invention:

1. In a ventilating system, the combination of a rotary converter comprising a rotatable armature having a spider member and a laminated circular magnetic core member secured to said spider member, a winding upon the outer cylindrical periphery of said core member, a commutator member secured on one side of said armature, a plurality of slip rings secured on the other side of said armature, a stator member surrounding said armature and co-operating therewith, a casing which partially encloses said rotary converter and extends on both sides of said stator member over the entire outer periphery of said armature, said casing having an exhaust port, a flue connected to said exhaust port and leading to a space remote from the operating room of said rotary converter and means for causing the air surrounding said rotary converter to flow along said commutator member and said slip rings and through said armature into the enclosure formed by said casing and thence through said flue to the space remote from the operating room of said machine.

2. In a ventilating system, the combination of an operating room, a rotary converter operating in said room and comprising a rotatable armature having a spider member and a circular laminated magnetic core secured to said spider member, a winding in slots in the outer periphery of said core, a commutator member secured in front of said armature, a plurality of slip rings mounted in the rear of said armature, a casing inclosing the outer periphery of said armature and of said commutator member, said casing having an exhaust port, a flue connected to said exhaust port and leading to a space remote from said operating room and means for causing the cooling air surrounding said rotary converter to flow from said slip rings and the rear and inner portions of said armature, and from the front portion of said commutator, into the enclosed space surrounding said armature and thence through said flue to the space remote from said operating room.

3. In a dynamo-electric machine, a rotor member comprising an armature provided with a circular core member of laminated material, a winding on the outer substantially cylindrical periphery of said core member, a freely accessible commutator member on one side of said armature, a plurality of freely accessible slip rings on the other side of said armature, a stator member surrounding said armature and co-operating therewith, a bell-shaped casing extending on each side of said stator member into proximity to the end of outer periphery of said armature and co-operating with said stator member to provide an enclosure of the space between the outer periphery of said armature and said stator member, said enclosure having an exhaust port, and means for forcing a stream of air through said enclosure and said exhaust port and along said armature, said commutator member and said slip rings.

4. In a dynamo-electric machine, a rotor member comprising an armature provided with a circular core member of laminated material, said laminated core having ventilating ducts, a winding on the outer substantially cylindrical periphery of said core member, a freely accessible commutator member on one side of said armature, a plurality of freely accessible slip rings on the other side of said armature, a stator member surrounding said armature and co-operating therewith, a bell-shaped casing extending on each side of said stator member into proximity to the end of the outer periphery of said armature winding co-operating with said stator member to provide an enclosure of the air between the outer periphery of said armature and said stator member, said enclosure having an exhaust port, and means for causing the air surrounding said machine to flow through said armature ventilating ducts into said enclosure and thence into said exhaust port.

5. In a rotary converter of the booster type, a rotor member comprising a converter armature having a spider member and a circular laminated magnetic core secured to said spider member, a winding on the outer substantially cylindrical surface of said core, a commutator cylinder secured in front of said converter armature, a booster armature secured in rear of said converter armature, a plurality of freely accessible collector rings secured in rear of said booster armature, a stator member surrounding said converter armature, second stator member surrounding said booster armature, a casing extending on both sides of the stator member of said converter and reaching on one side to the stator member of said booster and on the other side, to the vicinity of the front edge of the outer surface of said commutator cylinder, the enclosure formed by said casing having an exhaust port, and means for producing a stream of air from the space surrounding said rotary converter across said slip rings and into said booster armature, thence through said converter armature and into the enclosure around said commutator cylinder and thence into said exhaust port.

6. In a rotary converter of the booster type, a rotor member comprising a converter armature having a circular laminated magnetic core, a winding on the outer substantially cylindrical surface of said core, a freely accessible commutator cylinder secured in front of said converter armature, a booster armature secured in rear of said converter armature, a plurality of freely accessible collector rings secured in rear of said booster armature, a stator member surrounding said converter armature, a second stator member surrounding said booster armature, a casing secured to the stator member of said converter armature and extending on the commutator side, to the vicinity of the front edge of said armature winding, and on the booster side, to the stator member of said booster armature, the enclosure formed by said casing having an exhaust port, and means for producing a flow of air from the space surrounding said rotary converter, on one side, along said commutator cylinder into the enclosure formed by said casing, and on the other side, along said collector rings into said booster, thence into said converter and into said enclosure, and from said enclosure into said exhaust port.

7. In a rotary converter of the booster type, a rotor member comprising a converter armature having a spider member and a circular laminated magnetic core secured to said spider member, a winding on the outer substantially cylindrical surface of said core, a freely accessible commutator cylinder secured in front of said converter armature, a booster armature secured in rear of said converter armature, a plurality of freely accessible collector rings secured in rear of said booster armature, a stator member surrounding said converter armature, a second stator member surrounding said booster armature, a casing extending on both sides of the stator member of said converter armature and reaching, on one side substantially to the stator member of said booster, and on the other side, to the vicinity of the front edge of the outer surface of said commutator cylinder, the enclosure formed by said casing having an exhaust port, and means including fan means provided on said rotor member for propelling the air surrounding said rotary converter along said collector rings and said booster into said converter spider and through said enclosure into said exhaust port.

8. In a rotary converter of the booster type, a rotor member comprising a converter armature having a circular laminated magnetic core, a winding on the outer substantially cylindrical surface of said core, a freely accessible commutator cylinder secured in front of said converter armature, a booster armature secured in rear of said converter armature, a plurality of freely excessible collector rings secured in rear of said booster armature, a stator member surrounding said converter armature, a second stator member surrounding said booster armature, a casing secured to the stator member of said converter armature and extending, on the commutator side, to the vicinity of the front edge of said armature winding, and on the booster side, to the stator member of said booster armature, the enclosure formed by said casing having an exhaust port, and means including fan and guide means upon said rotor member and guide means upon said casing, for causing the air from the space surrounding said rotary converter to flow from the rear along said collector rings and through said booster into said converter and therefrom into said enclosure and to flow from the front along said commutator cylinder into said enclosure, and to escape from said enclosure through said exhaust port.

9. In a rotary converter, a rotary member comprising a converter armature having a spider and a circular laminated magnetic core secured on the periphery of said spider, said armature having ventilating passages, end plates secured to said spider on both sides of said laminated core, a winding having overhanging coils secured on the outer substantially cylindrical surface of said core, supporting members for said coils, spokes for securing said supporting members, a commutator cylinder secured in front of said armature spider, conducting strips connecting said armature winding to said commutator cylinder, a stator frame surrounding said armature, pole members secured to said stator frame and co-operating with said armature, and a casing secured to said stator frame and comprising, on the rear side, a bell-shaped casing member extending from said frame to about the rear edge of said armature winding, and on the front side, a casing member extending from said frame to about the front edge of said commutator cylinder, a portion of said casing having an exhaust port, the ventilating passages, spokes and connecting strips being arranged to draw in the air from the surrounding space and to discharge it into the enclosure formed by said casing.

10. In a rotary converter, a rotor member comprising a converter armature having a spider and a circular laminated magnetic core secured on the periphery of said spider, said armature having ventilating passages, end plates secured to said spider on both sides of said laminated core, a winding having overhanging coils secured in the outer substantially cylindrical surface of said core, supporting members for said coils, spokes for securing said supporting members, a commutator cylinder secured in front of said armature spider, conducting strips connecting said armature winding to said commutator cylinder, a stator member comprising a stator frame surrounding said armature, and a casing secured to said frame and comprising a rear portion extending from said frame to near the rear end of said winding and a front portion extending adjacent to the front of said connecting strips, said casing having an exhaust port, the ventilating passages, spokes, and connecting strips being arranged to draw in air from the surrounding space and to discharge it into the enclosure formed by said casing.

11. In a rotary converter, a rotor member comprising a converter armature having a spider and a circular laminated magnetic core secured on the periphery of said spider, said armature having ventilating passages, end plates secured to said spider on both sides of said laminated core, a winding having overhanging coils secured in the outer cylindrical surface of said core, supporting members for said coils, spokes for securing said supporting members, a commutator cylinder secured in front of said armature spider, conducting strips connecting said armature winding to said commutator cylinder, a stator frame surrounding said armature, pole members secured to said stator frame and co-operating with said armature, and a casing secured to said stator frame and comprising, on the rear side, a bell-shaped casing member extending from said frame to about the rear edge of said armature winding, and on the front side, a casing member extending from said frame to about one of the edges of said commutator cylinder, the portion of the casing member adjacent to said commutator cylinder being of insulating material, said casing having an exhaust port, the ventilating passages, spokes, and connecting strips being arranged to draw in air from the surrounding space and to discharge it into the enclosure formed by said casing.

12. In a rotary converter of the booster type, a rotor member comprising a converter armature having a spider and a circular laminated magnetic core secured on the periphery of said spider, said armature having ventilating passages, end plates secured to said spider on both sides of said laminated core, a winding having overhanging coils secured in the outer substantially cylindrical surface of said core, supporting members for said coils, spokes for securing said supporting members, a commutator cylinder secured in front of said armature spider, conducting strips connecting said armature winding to said commutator cylinder, a booster armature secured in rear of said converter armature, a stator member surrounding said converter armature, a second stator member surrounding said booster armature, and a casing secured to the stator member of said converter and extending, on the rear side, to the stator member of said booster armature, and on the front side, near an edge of said commutator cylinder, said casing having an exhaust port, the ventilating passages, spokes, and connecting strips being arranged to suck in air from the surrounding space and to discharge it into the enclosure formed by said casing.

13. The combination with a dynamo-electric machine comprising certain noise-producing parts requiring easy accessibility and substantially continuous inspection, of a combined ventilating and noise-reducing means comprising a partially enclosing casing extending over said parts requiring inspection and accessibility, said casing having openings disposed adjacent to said parts and detachable transparent windows for making an air-tight enclosure for said openings.

In testimony whereof, I have hereunto subscribed my name this 11th day of July 1923.

FLOYD T. HAGUE.